(12) United States Patent
Katagiri et al.

(10) Patent No.: US 10,128,038 B2
(45) Date of Patent: Nov. 13, 2018

(54) ISOLATION TRANSFORMER

(71) Applicant: MITSUBISHI ELECTRIC CORPORATION, Chiyoda-ku (JP)

(72) Inventors: Kodai Katagiri, Chiyoda-ku (JP); Takuto Yano, Chiyoda-ku (JP); Atsutoshi Takada, Chiyoda-ku (JP); Yujiro Kido, Chiyoda-ku (JP); Yuji Sugaya, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/552,995

(22) PCT Filed: Nov. 17, 2015

(86) PCT No.: PCT/JP2015/082217
§ 371 (c)(1),
(2) Date: Aug. 23, 2017

(87) PCT Pub. No.: WO2016/147482
PCT Pub. Date: Sep. 22, 2016

(65) Prior Publication Data
US 2018/0040415 A1 Feb. 8, 2018

(30) Foreign Application Priority Data
Mar. 16, 2015 (JP) .................. 2015-052024

(51) Int. Cl.
*H01F 27/29* (2006.01)
*H01F 30/10* (2006.01)
(Continued)

(52) U.S. Cl.
CPC .............. *H01F 27/29* (2013.01); *H01F 27/24* (2013.01); *H01F 27/2871* (2013.01);
(Continued)

(58) Field of Classification Search
CPC ........................................... H01F 27/00–27/36
(Continued)

(56) References Cited

FOREIGN PATENT DOCUMENTS

| JP | 8-316060 A | 11/1996 |
|---|---|---|
| JP | 10-12454 A | 1/1998 |

(Continued)

OTHER PUBLICATIONS

International Search Report dated Feb. 2, 2016 in PCT/JP2015/082217 filed Nov. 17, 2015.

*Primary Examiner* — Tuyen Nguyen
(74) *Attorney, Agent, or Firm* — Oblon, McClelland, Maier & Neustadt, L.L.P.

(57) ABSTRACT

An isolation transformer wherein in a first coil group of a pair of coil groups provided in an isolation transformer, an inner peripheral side lead wire is drawn out in a positive direction of a z axis and then drawn out to an outer peripheral side of a primary side coil as a first inner peripheral side lead wire, and in a second coil group, the inner peripheral side lead wire is drawn out in a negative direction of the z axis and then drawn out to the outer peripheral side of the primary side coil as a second inner peripheral side lead wire. The first inner peripheral side lead wire and the second inner peripheral side lead wire are then connected to each other, such that respective inner peripheral side end portions are connected to each other in series.

13 Claims, 12 Drawing Sheets

(51) Int. Cl.
   *H01F 27/24*     (2006.01)
   *H02M 3/28*      (2006.01)
   *H01F 27/28*     (2006.01)
   *H02M 3/335*     (2006.01)

(52) U.S. Cl.
   CPC ............ *H01F 30/10* (2013.01); *H02M 3/285* (2013.01); *H02M 3/33569* (2013.01)

(58) Field of Classification Search
   USPC ........ 336/170, 173, 180–184, 200, 220–223, 336/232
   See application file for complete search history.

(56) References Cited

FOREIGN PATENT DOCUMENTS

| | | |
   |---|---|---|
   | JP | 2007-189396 A | 7/2007 |
   | JP | 2009-135320 A | 6/2009 |
   | JP | 2010-246364 A | 10/2010 |
   | JP | 5414824 B2    | 2/2014 |
   | JP | 2016-6816 A   | 1/2016 |

ISOLATION TRANSFORMER

TECHNICAL FIELD

This invention relates to an isolation transformer used in an isolated DC-DC converter, for example.

BACKGROUND ART

In a conventional DC-DC converter, a transformer may be used for the purpose of isolating a drive battery. This type of DC-DC converter is known as an isolated DC-DC converter. Further, leakage inductance exists in an isolation transformer.

Here, when the leakage inductance of the isolation transformer is large, the following problems occur. Firstly, eddy current loss increases. Secondly, LC resonance occurs due to respective electrostatic capacity components of the leakage inductance and the isolation transformer and a circuit connected to the isolation transformer, resulting in an increase in high frequency noise.

As a method for solving the problems described above, respective distances between a primary side coil and two secondary side coils are uniformly minimized by winding the primary side coil on a single plane rather than dividing the primary side coil, and disposing the primary side coil between layers formed by the two secondary side coils (see PTL 1, for example). With this method, the leakage inductance is reduced.

CITATION LIST

Patent Literature

[PTL 1] Japanese Patent Application Publication No. 2009-135320 (page 2, lines 3 to 7, page 5, lines 1 to 4, and FIG. 4)

SUMMARY OF INVENTION

Technical Problem

However, the prior art includes the following problem.
In the technique described in PTL 1, lead wires drawn out from respective end portions of a plurality of primary side coils are connected in series after being drawn out from identical directions. In this case, an electrostatic capacity between windings of the primary side coil and the secondary side coil becomes imbalanced between a positive electrode side and a negative electrode side.

When an electrostatic capacity component is generated between the windings of the primary side coil and the secondary side coil of the isolation transformer and the electrostatic capacity becomes imbalanced between the positive electrode side and the negative electrode side, as described above, an increase in common mode noise occurs.

This invention has been designed to solve the problem described above, and an object thereof is to obtain an isolation transformer that is capable of reducing common mode noise while reducing leakage inductance.

Solution to Problem

An isolation transformer according to this invention is provided with a pair of coil groups, each of the pair of coil groups including a primary side coil and a first secondary side coil and a second secondary side coil that sandwich the primary side coil perpendicular to a central axis of the primary side coil, wherein: when the central axis is set as a z axis and a perpendicular plane to the z axis is set as an xy plane, the first secondary side coil is positioned on a positive direction side of the z axis relative to the primary side coil and the second secondary side coil is positioned on a negative direction side of the z axis relative to the primary side coil; the primary side coil includes a coil portion wound in a spiral shape on a single xy plane, an inner peripheral side lead wire drawn out from an inner peripheral side end portion of the coil portion, and an outer peripheral side lead wire drawn out from an outer peripheral side end portion of the coil portion; in a first coil group among the pair of coil groups, the inner peripheral side lead wire is drawn out in the positive direction of the z axis and then drawn out to an outer peripheral side of the primary side coil as a first inner peripheral side lead wire, and in a second coil group, the inner peripheral side lead wire is drawn out in the negative direction of the z axis and then drawn out to the outer peripheral side of the primary side coil as a second inner peripheral side lead wire; and the first inner peripheral side lead wire and the second inner peripheral side lead wire are connected each other, such that the respective inner peripheral side end portions are connected to each other in series.

Advantageous Effects of Invention

According to this invention, a positional relationship between the lead wires drawn out from the respective end portions of the primary side coil is set so that an electrostatic capacity generated between windings of the primary side coil and the secondary side coils is balanced between a positive electrode side and a negative electrode side. As a result, an isolation transformer that is capable of reducing common mode noise while reducing leakage inductance can be obtained.

DESCRIPTION OF EMBODIMENTS

Figure 1:
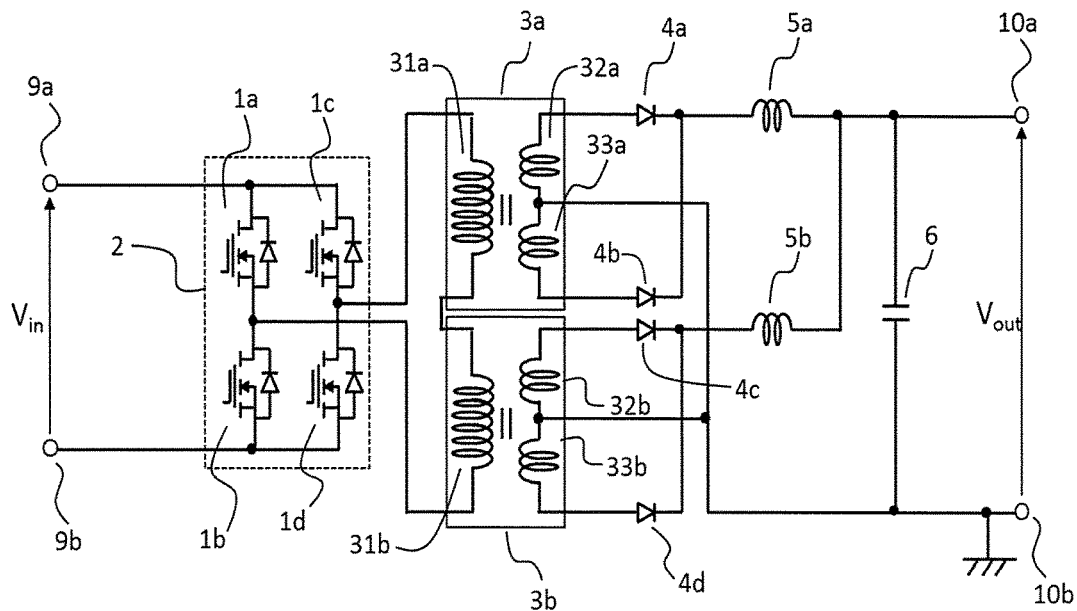
FIG. 1 is a circuit diagram showing an example of an isolated DC-DC converter to which this invention is applied.

Preferred embodiments of an isolation transformer according to this invention will be described below using the drawings. Note that in the description of the drawings, identical reference numerals have been attached to identical or corresponding parts, and duplicate description thereof has been omitted.

Figure 2:
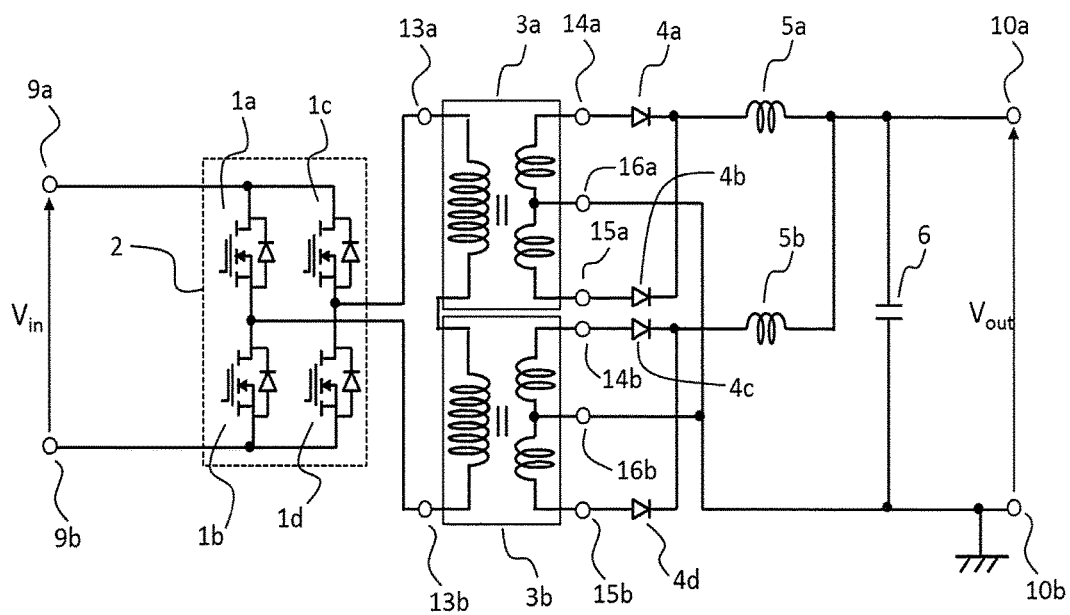
FIG. 2 is a circuit diagram relating to FIG. 1 and illustrating primary side connection terminals and secondary side connection terminals of an isolation transformer.
Figure 3:
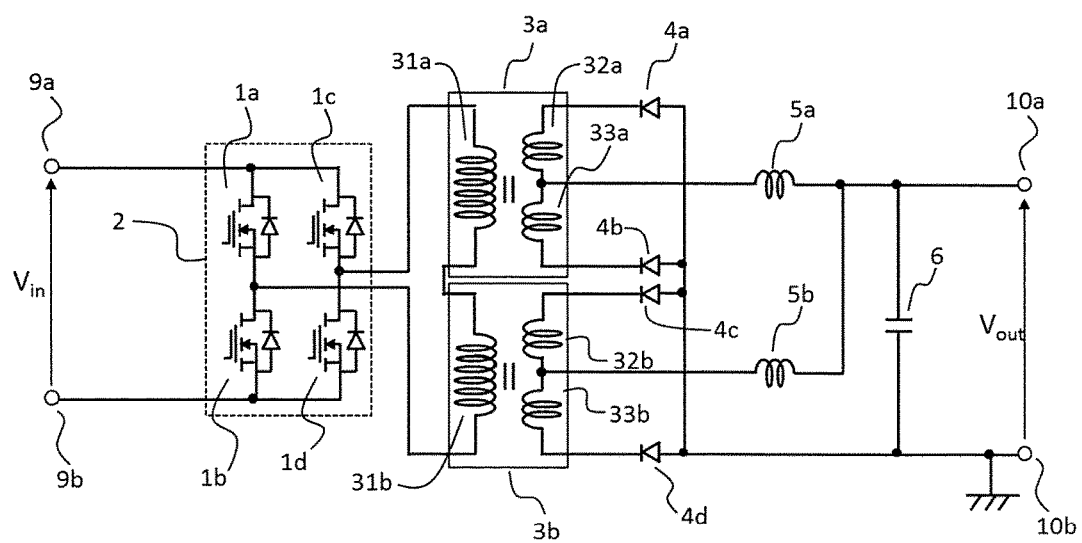
FIG. 3 is a circuit diagram showing another example of an isolated DC-DC converter to which this invention is applied.

Before describing the respective embodiments, first, a configuration of a DC-DC converter that may be cited as a specific example of a device having an isolation transformer according to this invention will be described with reference to FIG. 1, FIG. 2, and FIG. 3. FIG. 1 is a circuit diagram showing an example of an isolated DC-DC converter to which this invention is applied. FIG. 2 is a circuit diagram relating to FIG. 1 and illustrating primary side connection terminals 13a and 13b and secondary side connection terminals 14a, 15a, 16a, 14b, 15b, and 16b of an isolation transformer. FIG. 3 is a circuit diagram showing another example of an isolated DC-DC converter to which this invention is applied.

The DC-DC converter shown in FIG. 1 and FIG. 2 comprises a DC-AC conversion circuit 2 having semiconductor elements 1a, 1b, 1c and 1d, an isolation transformer having a first coil group 3a and a second coil group 3b, rectifying elements 4a, 4b, 4c, and 4d, smoothing coils 5a and 5b, and a smoothing capacitor 6. The first coil group 3a includes a primary side coil 31a and secondary side coils 32a and 33a. The second coil group 3b includes a primary side coil 31b and secondary side coils 32b and 33b.

The DC-AC conversion circuit 2 outputs an AC voltage to the primary side coils 31a and 31b of the isolation transformer by switching respective semiconductor elements 1a, 1b, 1c, and 1d ON and OFF with respect to a DC voltage Vin input from input terminals 9a and 9b.

The first coil group 3a and the second coil group 3b constituting the isolation transformer vary the AC voltage in accordance with a winding number ratio between the primary side coils 31a and 31b and the secondary side coils 32a, 33a, 32b, and 33b. Further, as shown in FIG. 2, the primary side coil 31a is connected to a connection point between the semiconductor elements 1c and 1d via the primary side connection terminal 13a, and the primary side coil 31b is connected to a connection point between the semiconductor elements 1a and 1b via the primary side connection terminal 13b.

The rectifying elements 4a, 4b, 4c, and 4d rectify the AC voltage input from the secondary side coils 32a, 33a, 32b, and 33b. The rectified AC voltage, or in other words a resulting DC voltage, is smoothed by the smoothing coils 5a and 5b and the smoothing capacitor 6. The smoothed DC voltage is output to a load (not shown) connected to output terminals 10a and 10b as a DC voltage Vout.

As shown in FIG. 2, the secondary side coil 32a is connected to an anode side of the rectifying element 4a via the secondary side connection terminal 14a, and the secondary side coil 33a is connected to an anode side of the rectifying element 4b via the secondary side connection terminal 15a. Further, the secondary side coil 32b is connected to an anode side of the rectifying element 4c via the secondary side connection terminal 14b, and the secondary side coil 33b is connected to an anode side of the rectifying element 4d via the secondary side connection terminal 15b. Furthermore, the secondary side coils 32a and 33a are connected to each other via the secondary side connection terminal 16a, and the secondary side coils 32b and 33b are connected to each other via the secondary side connection terminal 16b.

Note that the isolated DC-DC converter described above as an example is configured such that two coils are connected in series in the primary side coil of the isolation transformer. However, the isolated DC-DC converter may be configured such that another even number multiple of coils, such as four coils or six coils, are connected to each other in series.

In addition, here, the semiconductor elements 1a, 1b, 1c, and 1d are exemplified as MOSFETs. However, this invention is not limited thereto, and semiconductor elements other than MOSFETs, such as IGBTs or thyristors, may be used as the semiconductor elements 1a, 1b, 1c, and 1d.

Furthermore, here, the rectifying elements 4a, 4b, 4c, and 4d are exemplified as diodes. However, this invention is not limited thereto, and semiconductor elements other than diodes, such as MOSFETs, IGBTs, or thyristors, may be used as the rectifying elements 4a, 4b, 4c, and 4d.

Moreover, FIG. 1 shows an example configuration in which diodes are used as the rectifying elements 4a, 4b, 4c, and 4d and the secondary side coils 32a and 33a are connected to respective anode sides of the diodes. However, this invention is not limited to this configuration, and as shown in FIG. 3, the secondary side coils 32a and 33a may be connected to respective cathode sides of the diodes.

First Embodiment

Figure 4:
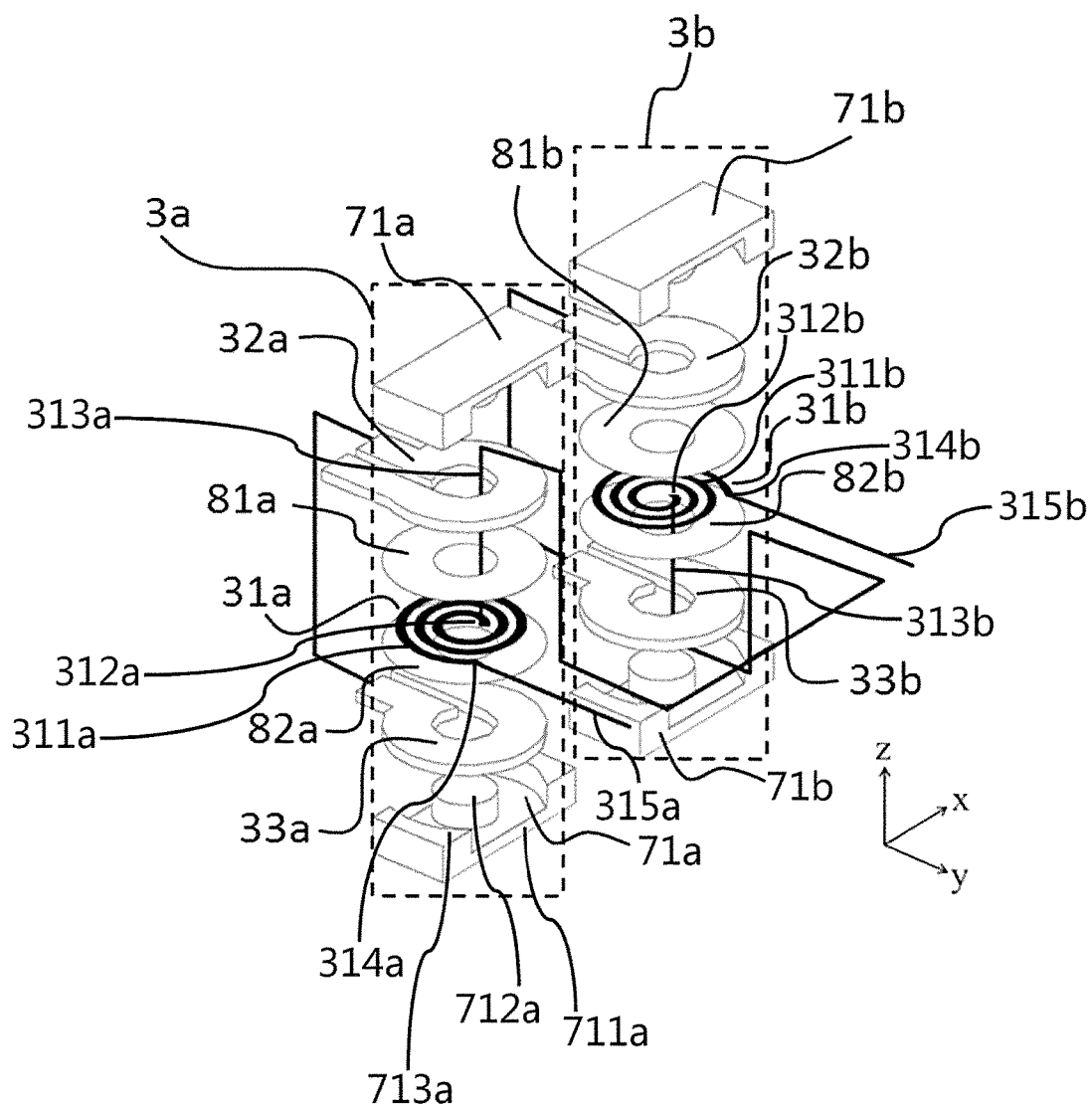
FIG. 4 is an exploded perspective view showing a configuration of an isolation transformer according to a first embodiment of this invention.

FIG. 4 is an exploded perspective view showing a configuration of an isolation transformer according to a first embodiment of this invention. In FIG. 4, respective central axes of the primary side coil 31a and the primary side coil 31b serve as a z axis, and a plane formed by an x axis and a y axis that are perpendicular to the z axis serves as an xy plane.

Here, a feature of the first embodiment is that in the first coil group 3a and the second coil group 3b, a first inner peripheral side lead wire 313a and a second inner peripheral side lead wire 313b are drawn out in different directions.

The isolation transformer shown in FIG. 4 includes the first coil group 3a, a pair of magnetic material core pieces 71a mounted on the first coil group 3a, the second coil group 3b, and a pair of magnetic material core pieces 71b mounted on the second coil group 3b.

The first coil group 3a includes the primary side coil 31a, the secondary side coil 32a, the secondary side coil 33a, an insulating spacer 81a, and an insulating spacer 82a. Further, in the first coil group 3a, the secondary side coil 33a, the insulating spacer 82a, the primary side coil 31a, the insulating spacer 81a, and the secondary side coil 32a are stacked in that order in a positive direction of the z axis.

The second coil group 3b includes the primary side coil 31b, the secondary side coil 32b, the secondary side coil 33b, an insulating spacer 81b, and an insulating spacer 82b. Further, in the second coil group 3b, the secondary side coil 33b, the insulating spacer 82b, the primary side coil 31b, the insulating spacer 81b, and the secondary side coil 32b are stacked in that order in the positive direction of the z axis.

The primary side coil 31a includes a coil portion 311a wound in a spiral shape on the xy plane, a first inner peripheral side lead wire 313a drawn out from an inner peripheral side end portion 312a serving as an end portion of the coil portion 311a on an inner peripheral side, and an outer peripheral side lead wire 315a drawn out from an outer peripheral side end portion 314a serving as an end portion of the coil portion 311a on an outer peripheral side. Here, as shown in FIG. 4, the coil portion 311a is wound in a spiral shape on a single plane, or in other words a single xy plane. As a result, respective distances between the primary side coil 31a and the secondary side coils 32a and 33a can be minimized.

The outer peripheral side lead wire 315a is drawn out from the outer peripheral side end portion 314a in a positive direction of the y axis. Further, the first inner peripheral side lead wire 313a is drawn out from the inner peripheral side end portion 312a in the positive direction of the z axis, and then drawn out to the outer peripheral side of the primary side coil 31a. More specifically, the first inner peripheral side lead wire 313a is drawn out in the positive direction of the z axis through central holes formed respectively in the insulating spacer 81a and the secondary side coil 32a, which face the primary side coil 31a, and then drawn out in the positive direction of the y axis.

The primary side coil 31b includes a coil portion 311b wound in a spiral shape on the xy plane, a second inner peripheral side lead wire 313b drawn out from an inner peripheral side end portion 312b serving as an end portion of the coil portion 311b on an inner peripheral side, and an outer peripheral side lead wire 315b drawn out from an outer peripheral side end portion 314b serving as an end portion of the coil portion 311b on an outer peripheral side. Here, as shown in FIG. 4, the coil portion 311b, similarly to the coil portion 311a, is wound in a spiral shape on a single plane, or in other words a single xy plane. As a result, respective distances between the primary side coil 31b and the secondary side coils 32b and 33b can be minimized.

The outer peripheral side lead wire 315b is drawn out from the outer peripheral side end portion 314b in the positive direction of the y axis. Further, the second inner peripheral side lead wire 313b is drawn out from the inner peripheral side end portion 312b in a negative direction of the z axis, and then drawn out to the outer peripheral side of the primary side coil 31b. More specifically, the second inner peripheral side lead wire 313b is drawn out in the negative direction of the z axis through central holes formed respectively in the insulating spacer 82b and the secondary side coil 33a, which face the primary side coil 31b, and then drawn out in the positive direction of the y axis.

Furthermore, the first inner peripheral side lead wire 313a drawn out to the outer peripheral side of the primary side coil 31a and the second inner peripheral side lead wire 313b drawn out to the outer peripheral side of the primary side coil 31b are connected to each other, whereby the inner peripheral side end portion 312a and the inner peripheral side end portion 312b are connected to each other in series.

The secondary side coil 32a is positioned on the positive side of the z axis with respect to the primary side coil 31a, and the secondary side coil 33a is positioned on the negative direction side of the z axis with respect to the primary side coil 31a. Further, the secondary side coil 32a and the secondary side coil 33a sandwich the primary side coil 31a perpendicular to the z axis.

The pair of magnetic material core pieces 71a, which together constitute a magnetic material core, have an E-shaped cross-section, and each thereof includes a base portion 711a, a middle leg portion 712a projecting from the center of the base portion 711a, and outer leg portions 713a projecting from respective end portions of the base portion 711a. The respective middle leg portions 712a of the pair of magnetic material core pieces 71a are inserted into a central hole in the first coil group 3a from above and below. End surfaces of the respective middle leg portions 712a and end surfaces of the respective outer leg portions 713a of the pair of magnetic material core pieces 71a are then abutted against each other. As a result, the first coil group 3a is mounted within the magnetic material core.

The insulating spacer 81a is provided for the purpose of providing insulation between layers formed by the primary side coil 31a and the secondary side coil 32a. Similarly, the insulating spacer 82a is provided for the purpose of providing insulation between layers formed by the primary side coil 31a and the secondary side coil 33a.

The secondary side coil 32b, the secondary side coil 33b, the pair of magnetic material core pieces 71b, the insulating spacer 81b, and the insulating spacer 82b are respectively identical to the secondary side coil 32a, the secondary side coil 33a, the pair of magnetic material core pieces 71a, the insulating spacer 81a, and the insulating spacer 82a, and therefore description thereof has been omitted.

Note that in the first embodiment, as shown in FIG. 4, an isolation transformer having a magnetic material core in which the pair of coil groups, namely the first coil group 3a and the second coil group 3b, are mounted individually was described as an example.

Figure 5:
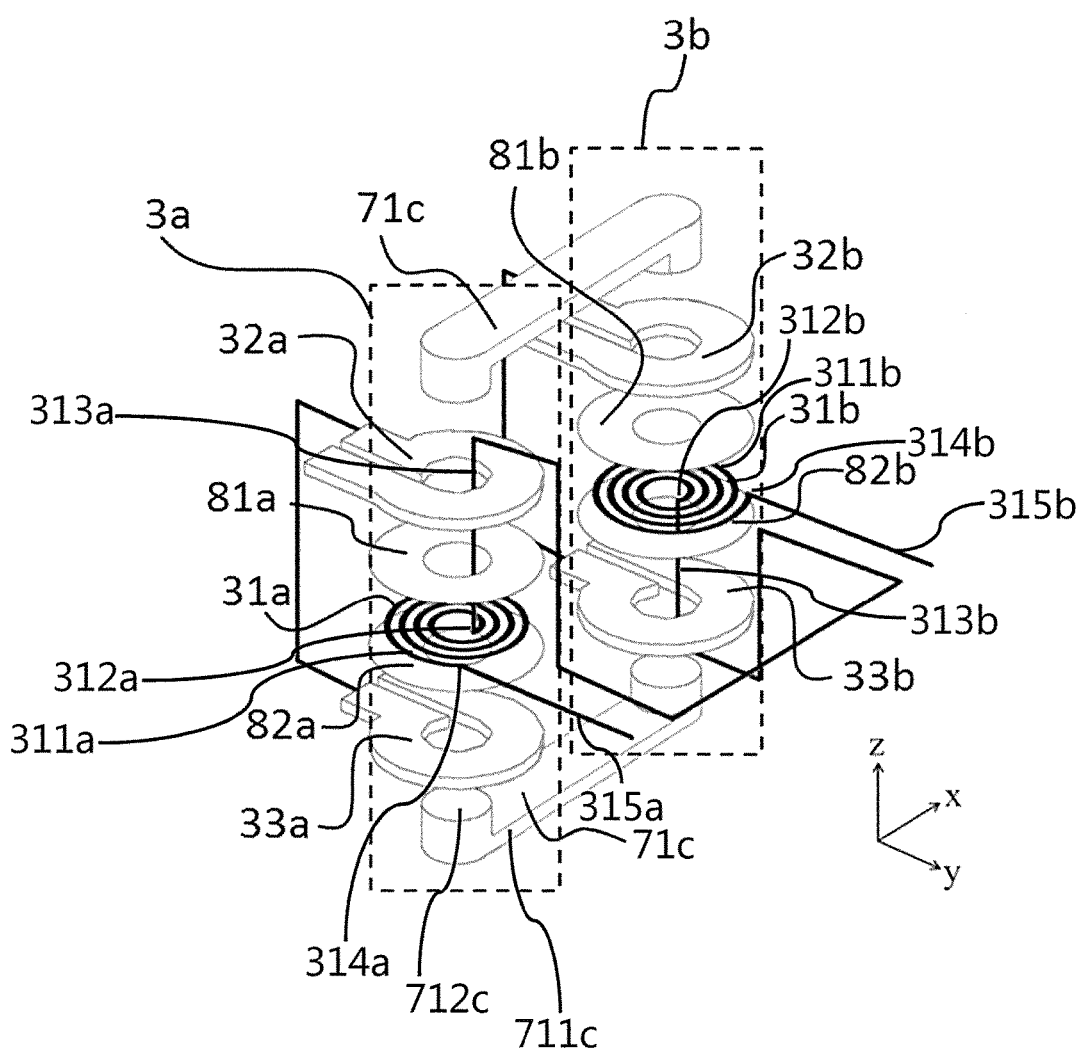
FIG. 5 is an exploded perspective view showing a configuration of another example of the isolation transformer according to the first embodiment of this invention.

As shown in FIG. 5, however, the isolation transformer may be configured such that a magnetic material core is mounted on the pair of coil groups, or in other words both the first coil group 3a and the second coil group 3b. FIG. 5 is an exploded perspective view showing a configuration of another example of the isolation transformer according to the first embodiment of this invention.

In this case, a pair of magnetic material core pieces 71c constituting a magnetic material core shown in FIG. 5 have a U-shaped cross-section, and each thereof includes a base portion 711c and outer leg portions 712c projecting from respective end portions of the base portion 711c. The respective outer leg portions 712c of the pair of magnetic material core pieces 71c are inserted into central holes in the first coil group 3a and the second coil group 3b from above and below. End surfaces of the respective outer leg portions 712c of the pair of magnetic material core pieces 71c are then abutted against each other. As a result, the first coil group 3a and the second coil group 3b are mounted within the magnetic material core.

Figure 6:
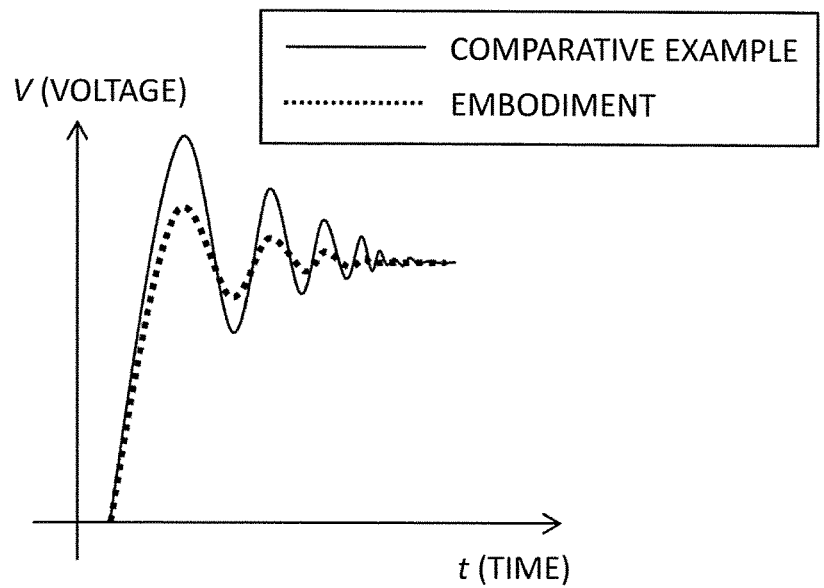
FIG. 6 is an illustrative view illustrating a reduction in leakage inductance realized by the configuration of the isolation transformer according to the first embodiment of this invention.
Figure 7:
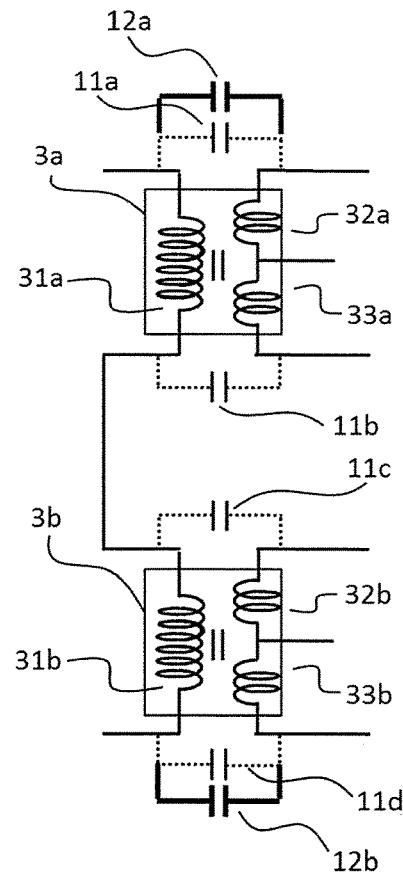
FIG. 7 is an illustrative view illustrating a reduction in common mode noise realized by the configuration of the isolation transformer according to the first embodiment of this invention.
Figure 8:
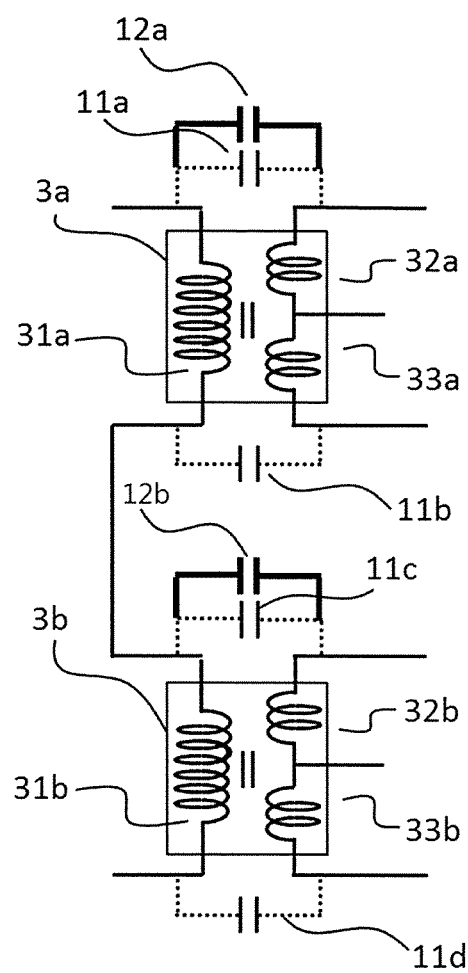
FIG. 8 is an illustrative view illustrating the reduction in common mode noise realized by the configuration of the isolation transformer according to the first embodiment of this invention.

Next, effects obtained with the configuration of the isolation transformer according to the first embodiment will be described with reference to FIG. 6, FIG. 7, and FIG. 8. FIG. 6 is an illustrative view illustrating a reduction in leakage inductance realized by the configuration of the isolation transformer according to the first embodiment of this invention. FIG. 7 and FIG. 8 are illustrative views illustrating a reduction in common mode noise realized by the configuration of the isolation transformer according to the first embodiment of this invention.

FIG. 6 is a graph having time t on the abscissa and a voltage V on the ordinate, and shows how LC resonance decreases as the leakage inductance decreases. Here, as described above, when the leakage inductance of the isolation transformer is large, increases occur in eddy current loss and in high frequency noise caused by the LC resonance.

To solve this problem, a configuration in which the primary side coils 31a and 31b of the first and second coil groups 3a and 3b are wound in a spiral shape on the xy plane may be employed, as in the first embodiment. By employing this configuration, the respective distances between the primary side coil 31a and the secondary side coils 32a and 33a of the first coil group 3a can be minimized. Similarly, the respective distances between the primary side coil 31b and the secondary side coils 32b and 33b of the second coil group 3b can be minimized.

As a result, eddy current loss can be reduced, and furthermore, as shown in FIG. 6, LC resonance can be reduced in comparison with a comparative example in which the above configuration is not employed. Therefore, by configuring the isolation transformer of the first embodiment in the manner described above, eddy current loss and high frequency noise can be reduced effectively.

FIG. 7 is a pattern diagram showing a condition in which an electrostatic capacity between windings of the primary side coil and the secondary side coils is balanced between a positive electrode side and a negative electrode side. Further, FIG. 8 is a pattern diagram showing a comparative example of FIG. 7, in which the electrostatic capacity between the windings of the primary side coil and the secondary side coils is imbalanced between the positive electrode side and the negative electrode side.

Here, as shown in FIG. 7 and FIG. 8, capacitance components between the primary side coil and the secondary side coil include electrostatic capacity components 11a, 11b, 11c, and 11d between the windings of the primary side coil and the secondary side coils, and also electrostatic capacity components 12a and 12b to be described below.

First, a case in which the first inner peripheral side lead wire 313a and the second inner peripheral side lead wire 313b of the first coil group 3a and the second coil group 3b are drawn out in identical directions will be considered as a comparative example of the first embodiment. More specifically, a case in which the first inner peripheral side lead wire 313a and the second inner peripheral side lead wire 313b are both drawn out in the positive direction of the z axis, then drawn out to the respective outer peripheral sides of the primary side coils 31a and 31b, and then connected to each other will be considered.

In this case, as shown in FIG. 8, the electrostatic capacity 12a exists between the primary side coil 31a and the secondary side coil 32a as a capacitance component between windings of the first inner peripheral side lead wire 313a and the secondary side coil 32a. Meanwhile, the electrostatic capacity 12b exists between the primary side coil 31b and the secondary side coil 32b as a capacitance component between windings of the second inner peripheral side lead wire 313b and the secondary side coil 32b.

Hence, as shown in FIG. 8, the electrostatic capacity between the windings of the primary side coil and the secondary side coils is imbalanced between the positive electrode side and the negative electrode side, and as a result, an increase in common mode noise occurs, as described above.

In the first embodiment, on the other hand, the first inner peripheral side lead wire 313a and the second inner peripheral side lead wire 313b of the first coil group 3a and the second coil group 3b are drawn out in different directions. More specifically, the first inner peripheral side lead wire 313a is drawn out in the positive direction of the z axis and then drawn out to the outer peripheral side of the primary side coil 31a, and the second inner peripheral side lead wire 313b is drawn out in the negative direction of the z axis and then drawn out to the outer peripheral side of the primary side coil 31b, whereupon the first inner peripheral side lead wire 313a and the second inner peripheral side lead wire 313b are connected to each other.

In this case, as shown in FIG. 7, the electrostatic capacity 12a exists between the primary side coil 31a and the secondary side coil 32a as a capacitance component between the windings of the first inner peripheral side lead wire 313a and the secondary side coil 32a. Meanwhile, the electrostatic capacity 12b exists between the primary side coil 31b and the secondary side coil 33b as a capacitance component between the windings of the second inner peripheral side lead wire 313b and the secondary side coil 33b.

Hence, as shown in FIG. 7, the electrostatic capacity between the windings of the primary side coil and the secondary side coils can be balanced between the positive electrode side and the negative electrode side, and as a result, a reduction in common mode noise can be achieved.

Note that in the first embodiment, the first inner peripheral side lead wire 313a may be drawn out in the negative direction of the z axis and then drawn out to the outer peripheral side of the primary side coil 31a, and the second inner peripheral side lead wire 313b may be drawn out in the positive direction of the z axis and then drawn out to the outer peripheral side of the primary side coil 31b, whereupon the first inner peripheral side lead wire 313a and the second inner peripheral side lead wire 313b may be connected to each other.

In this case, the electrostatic capacity 12a exists between the primary side coil 31a and the secondary side coil 33a as a capacitance component between the windings of the first inner peripheral side lead wire 313a and the secondary side coil 33a. Meanwhile, the electrostatic capacity 12b exists between the primary side coil 31b and the secondary side coil 32b as a capacitance component between the windings of the second inner peripheral side lead wire 313b and the secondary side coil 32b.

Similarly, therefore, the electrostatic capacity between the windings of the primary side coil and the secondary side coil can be balanced between the positive electrode side and the negative electrode side, and as a result, a reduction in common mode noise can be achieved.

According to the first embodiment, as described above, in one of the pair of coil groups of the isolation transformer, the inner peripheral side lead wire is drawn out in the positive direction of the z axis and then drawn out to the outer peripheral side of the primary side coil as a first inner peripheral side lead wire, and in the other coil group, the inner peripheral side lead wire is drawn out in the negative direction of the z axis and then drawn out to the outer peripheral side of the primary side coil as a second inner peripheral side lead wire. The first inner peripheral side lead wire and the second inner peripheral side lead wire are then connected to each other, whereby the respective inner peripheral side end portions are connected in series.

In so doing, common mode noise can be reduced while reducing leakage inductance. In other words, the leakage inductance of the isolation transformer can be reduced, enabling reductions in eddy current loss and high frequency noise. Moreover, the electrostatic capacity between the windings of the primary side coil and the secondary side coils can be balanced between the positive electrode side and the negative electrode side, and as a result, the common mode noise can also be reduced.

Second Embodiment

In a second embodiment of this invention, in contrast to the first embodiment, the first inner peripheral side lead wire 313a is drawn out in the positive direction of the z axis and then drawn out to the outer peripheral side of the primary side coil 31a through a first groove 91a, while the second inner peripheral side lead wire 313b is drawn out in the negative direction of the z axis and then drawn out to the outer peripheral side of the primary side coil 31b through a second groove 91b.

Figure 9:
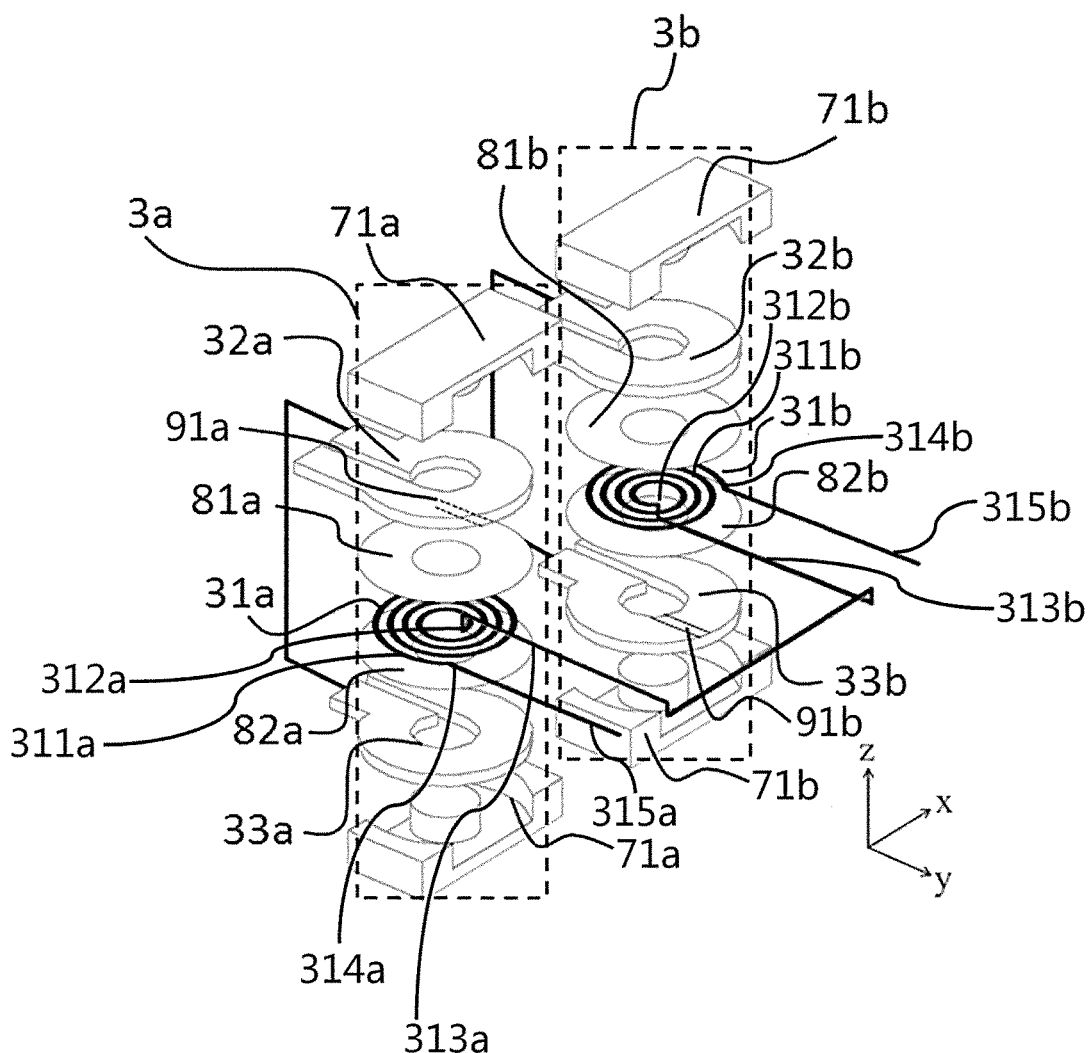
FIG. 9 is an exploded perspective view showing a configuration of an isolation transformer according to a second embodiment of this invention.

FIG. 9 is an exploded perspective view showing a configuration of an isolation transformer according to the second embodiment of this invention. In the second embodiment, description of points that are similar to the first embodiment will be omitted, and points that differ from the first embodiment will mainly be described.

In the first coil group 3a, the first inner peripheral side lead wire 313a drawn out from the inner peripheral side end portion 312a in the positive direction of the z axis is drawn out in the positive direction of the y axis in a position in front of the insulating spacer 81a rather than being passed through the central holes formed respectively in the insulating spacer 81a and the secondary side coil 32a. Further, the first groove 91a is formed in a primary side coil 31a side surface of the secondary side coil 32a.

When the first coil group 3a is mounted in the magnetic material core, the first inner peripheral side lead wire 313a drawn out in the positive direction of the y axis in a position in front of the insulating spacer 81a is housed in the first groove 91a. In other words, the first inner peripheral side lead wire 313a is drawn out to the outer peripheral side of the primary side coil 31a through the first groove 91a.

In the second coil group 3b, the second inner peripheral side lead wire 313b drawn out from the inner peripheral side end portion 312b in the negative direction of the z axis is drawn out in the positive direction of the y axis in a position in front of the insulating spacer 82b rather than being passed through the central holes formed respectively in the insulating spacer 82b and the secondary side coil 33b. Further, the second groove 91b is formed in a primary side coil 31b side surface of the secondary side coil 33b.

When the second coil group 3b is mounted in the magnetic material core, the second inner peripheral side lead wire 313b drawn out in the positive direction of the y axis in a position in front of the insulating spacer 82b is housed in the second groove 91b. In other words, the second inner peripheral side lead wire 313b is drawn out to the outer peripheral side of the primary side coil 31b through the second groove 91b.

Furthermore, by connecting the first inner peripheral side lead wire 313a drawn out to the outer peripheral side of the primary side coil 31a and the second inner peripheral side lead wire 313b drawn out to the outer peripheral side of the primary side coil 31b to each other, the inner peripheral side end portion 312a and the inner peripheral side end portion 312b are connected to each other in series.

Note that in the second embodiment, the first inner peripheral side lead wire 313a may be drawn out in the negative direction of the z axis and then drawn out to the outer peripheral side of the primary side coil 31a, and the second inner peripheral side lead wire 313b may be drawn out in the positive direction of the z axis and then drawn out to the outer peripheral side of the primary side coil 31b, whereupon the first inner peripheral side lead wire 313a and the second inner peripheral side lead wire 313b may be connected to each other. In this case, the first groove 91a is formed in a primary side coil 31a side surface of the secondary side coil 33a, and the second groove 91b is formed in a primary side coil 31b side surface of the secondary side coil 32b.

Therefore, by configuring the isolation transformer as described in the second embodiment, similar effects to the first embodiment are obtained.

Third Embodiment

In a third embodiment of this invention, in contrast to the first and second embodiments, the first inner peripheral side lead wire 313a and a third inner peripheral side lead wire 316a bifurcate from the inner peripheral side end portion 312a and are then drawn out in opposite directions, while the second inner peripheral side lead wire 313b and a fourth inner peripheral side lead wire 316b bifurcate from the inner peripheral side end portion 312b and are then drawn out in opposite directions.

Figure 10:
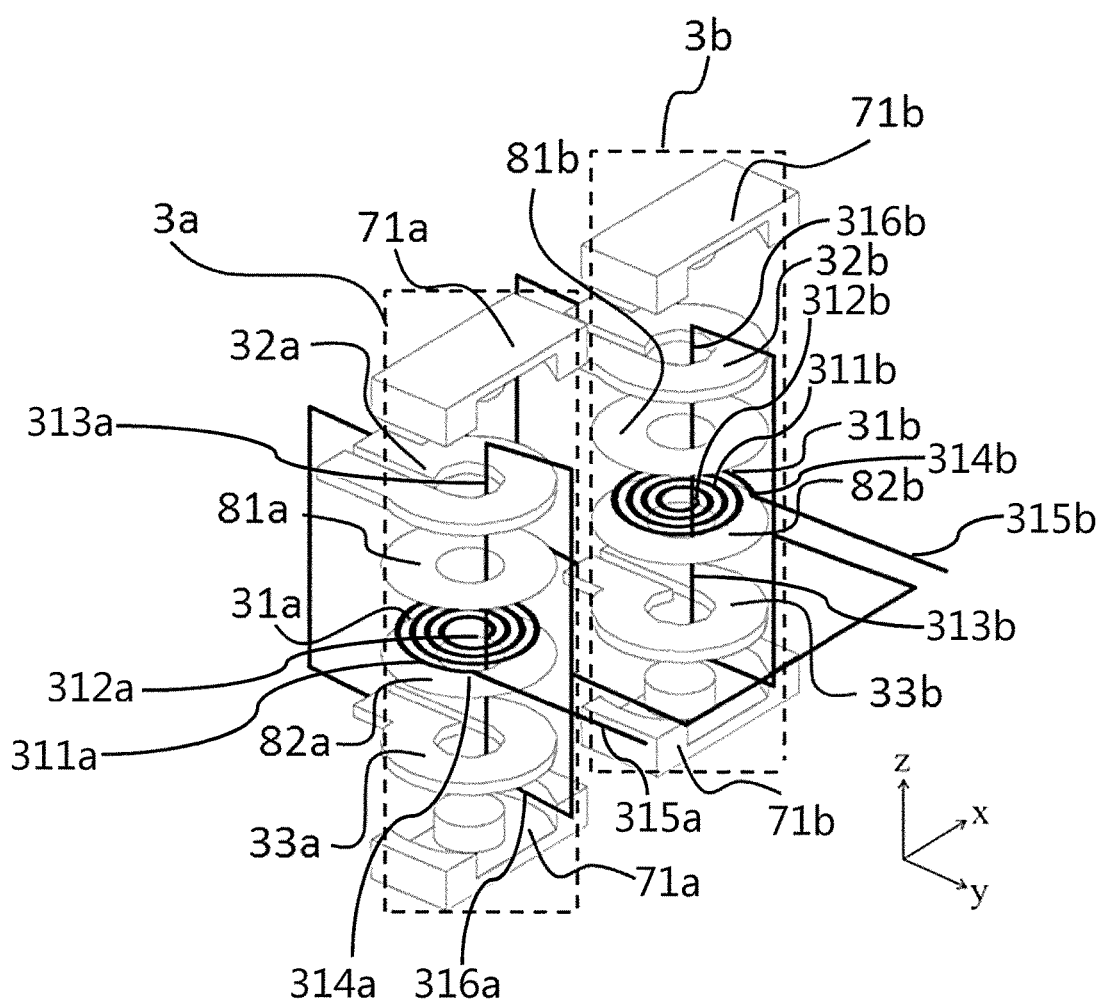
FIG. 10 is an exploded perspective view showing a configuration of an isolation transformer according to a third embodiment of this invention.

FIG. 10 is an exploded perspective view showing a configuration of an isolation transformer according to the third embodiment of this invention. Note that in the third embodiment, description of points that are similar to the first and second embodiments will be omitted, and points that differ from the first and second embodiments will mainly be described.

In the first coil group 3a, the first inner peripheral side lead wire 313a and the third inner peripheral side lead wire 316a bifurcate from the inner peripheral side end portion 312a, whereupon the first inner peripheral side lead wire 313a is drawn out in the positive direction of the z axis and the third inner peripheral side lead wire 316a is drawn out in the negative direction of the z axis. Further, the first inner peripheral side lead wire 313a is drawn out to the outer peripheral side of the primary side coil 31a after being drawn out in the positive direction of the z axis, and the third inner peripheral side lead wire 316a is drawn out to the outer peripheral side of the primary side coil 31a after being drawn out in the negative direction of the z axis.

More specifically, as shown in FIG. 10, the first inner peripheral side lead wire 313a is passed through the central hole in the secondary side coil 32a facing the primary side coil 31a, and then drawn out to the outer peripheral side of the primary side coil 31a. Further, the third inner peripheral side lead wire 316a is passed through a central hole in the secondary side coil 33a facing the primary side coil 31a, and then drawn out to the outer peripheral side of the primary side coil 31a.

Furthermore, the first inner peripheral side lead wire 313a and the third inner peripheral side lead wire 316a drawn out to the outer peripheral side of the primary side coil 31a converge on the outer peripheral side of the primary side coil 31a.

In the second coil group 3b, the second inner peripheral side lead wire 313b and the fourth inner peripheral side lead wire 316b bifurcate from the inner peripheral side end portion 312b, whereupon the second inner peripheral side lead wire 313b is drawn out in the negative direction of the z axis and the fourth inner peripheral side lead wire 316b is drawn out in the positive direction of the z axis. Further, the second inner peripheral side lead wire 313b is drawn out to the outer peripheral side of the primary side coil 31b after being drawn out in the negative direction of the z axis, and the fourth inner peripheral side lead wire 316b is drawn out to the outer peripheral side of the primary side coil 31b after being drawn out in the positive direction of the z axis.

More specifically, as shown in FIG. 10, the second inner peripheral side lead wire 313b is passed through a central hole in the secondary side coil 33b facing the primary side coil 31b, and then drawn out to the outer peripheral side of the primary side coil 31b. Further, the fourth inner peripheral side lead wire 316b is passed through the central hole in the secondary side coil 32b facing the primary side coil 31b, and then drawn out to the outer peripheral side of the primary side coil 31b.

Furthermore, the second inner peripheral side lead wire 313b and the fourth inner peripheral side lead wire 316b drawn out to the outer peripheral side of the primary side coil 31b converge on the outer peripheral side of the primary side coil 31b.

By connecting the converged first and third inner peripheral side lead wires 313a and 316a and the converged second and fourth inner peripheral side lead wires 313b and 316b to each other, the inner peripheral side end portion 312a and the inner peripheral side end portion 312b are connected to each other in series.

Therefore, by configuring the isolation transformer as described in the third embodiment, similar effects to the first embodiment are obtained.

Fourth Embodiment

In a fourth embodiment of this invention, the first and third inner peripheral side lead wires 313a and 316a bifurcating from the inner peripheral side end portion 312a and the second and fourth inner peripheral side lead wires 313b and 316b bifurcating from the inner peripheral side end portion 312b are drawn out differently to the third embodiment.

Figure 11:
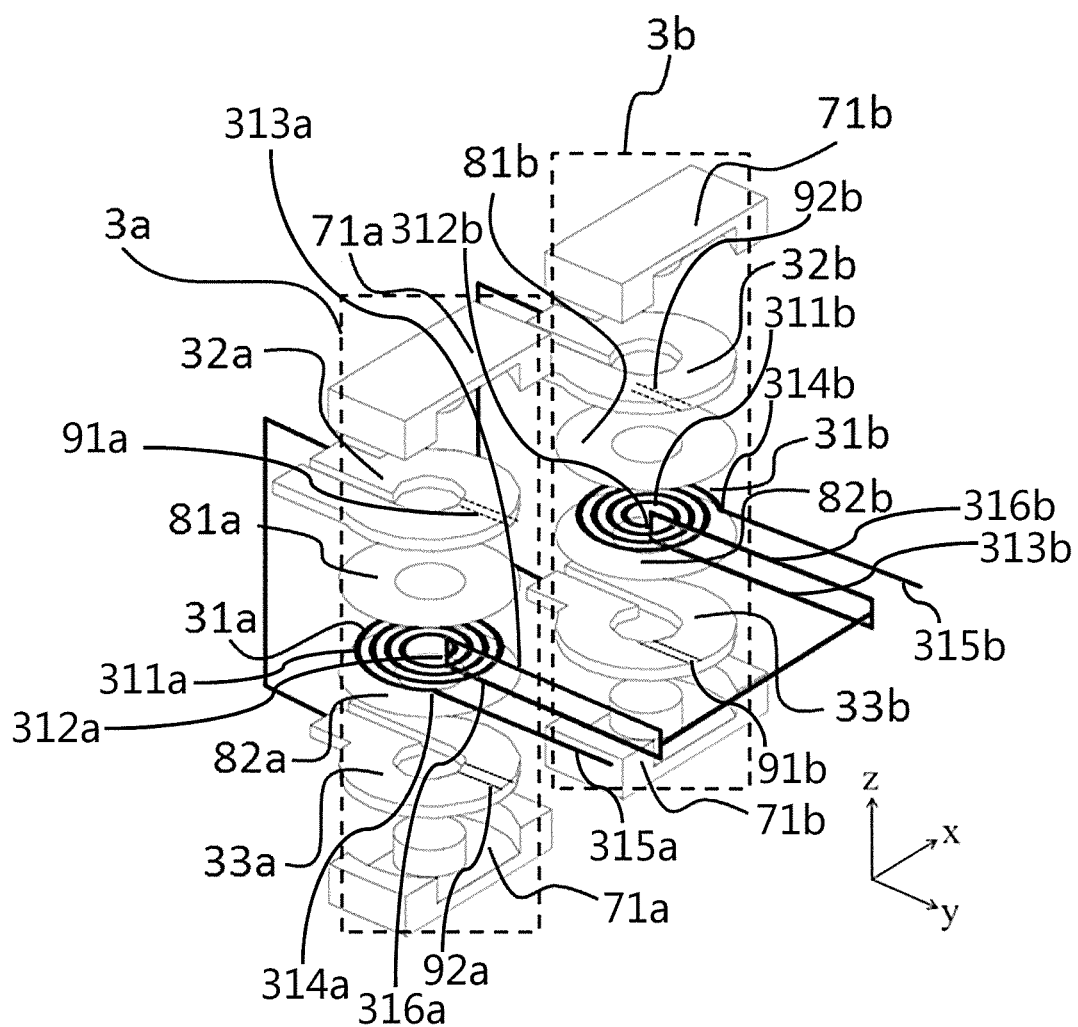
FIG. 11 is an exploded perspective view showing a configuration of an isolation transformer according to a fourth embodiment of this invention.

FIG. 11 is an exploded perspective view showing a configuration of an isolation transformer according to the fourth embodiment of this invention. Note that in the fourth embodiment, description of points that are similar to the first to third embodiments will be omitted, and points that differ from the first to third embodiments will mainly be described.

In the first coil group 3a, the first inner peripheral side lead wire 313a and the third inner peripheral side lead wire 316a bifurcate from the inner peripheral side end portion 312a, whereupon the first inner peripheral side lead wire 313a is drawn out in the positive direction of the z axis and the third inner peripheral side lead wire 316a is drawn out in the negative direction of the z axis. Further, the first inner peripheral side lead wire 313a is drawn out in the positive direction of the y axis in a position in front of the insulating spacer 81a rather than being passed through the central holes formed respectively in the insulating spacer 81a and the secondary side coil 32a, while the third inner peripheral side lead wire 316a is drawn out in the positive direction of the y axis in a position in front of the insulating spacer 82a rather than being passed through the central holes formed respectively in the insulating spacer 82a and the secondary side coil 33a.

The first inner peripheral side lead wire 313a and the third inner peripheral side lead wire 316a drawn out to the outer peripheral side of the primary side coil 31a converge on the outer peripheral side of the primary side coil 31a.

The first groove 91a is formed in the primary side coil 31a side surface of the secondary side coil 32a, and a third groove 92a is formed in the primary side coil 31a side surface of the secondary side coil 33a.

When the first coil group 3a is mounted in the magnetic material core, the first inner peripheral side lead wire 313a is housed in the first groove 91a and the third inner peripheral side lead wire 316a is housed in the third groove 92a. In other words, the first inner peripheral side lead wire 313a is drawn out to the outer peripheral side of the primary side coil 31a through the first groove 91a, and the third inner peripheral side lead wire 316a is drawn out to the outer peripheral side of the primary side coil 31a through the third groove 92a.

In the second coil group 3b, the second inner peripheral side lead wire 313b and the fourth inner peripheral side lead wire 316b bifurcate from the inner peripheral side end portion 312b, whereupon the second inner peripheral side lead wire 313b is drawn out in the negative direction of the z axis and the fourth inner peripheral side lead wire 316b is drawn out in the positive direction of the z axis. Further, the second inner peripheral side lead wire 313b is drawn out in the positive direction of the y axis in a position in front of the insulating spacer 82b rather than being passed through the central holes formed respectively in the insulating spacer 82b and the secondary side coil 33b, while the fourth inner peripheral side lead wire 316b is drawn out in the positive direction of the y axis in a position in front of the insulating spacer 81b rather than being passed through the central holes formed respectively in the insulating spacer 81b and the secondary side coil 32b.

The second inner peripheral side lead wire 313b and the fourth inner peripheral side lead wire 316b drawn out to the outer peripheral side of the primary side coil 31b converge on the outer peripheral side of the primary side coil 31b.

The second groove 91b is formed in the primary side coil 31b side surface of the secondary side coil 33b, and a fourth groove 92b is formed in the primary side coil 31b side surface of the secondary side coil 32b.

When the second coil group 3b is mounted in the magnetic material core, the second inner peripheral side lead wire 313b is housed in the second groove 91b and the fourth inner peripheral side lead wire 316b is housed in the fourth groove 92b. In other words, the second inner peripheral side lead wire 313b is drawn out to the outer peripheral side of the primary side coil 31b through the second groove 91b, and the fourth inner peripheral side lead wire 316b is drawn out to the outer peripheral side of the primary side coil 31b through the fourth groove 92b.

By connecting the converged first and third inner peripheral side lead wires 313a and 316a and the converged second and fourth inner peripheral side lead wires 313b and 316b to each other, the inner peripheral side end portion 312a and the inner peripheral side end portion 312b are connected to each other in series.

Therefore, by configuring the isolation transformer as described in the fourth embodiment, similar effects to the first embodiment are obtained.

Fifth Embodiment

In a fifth embodiment of this invention, in contrast to the first to fourth embodiments, the transformer is configured to include a single coil group, namely the first coil group 3a, instead of a pair of coil groups, namely the first coil group 3a and the second coil group 3b.

Figure 12:
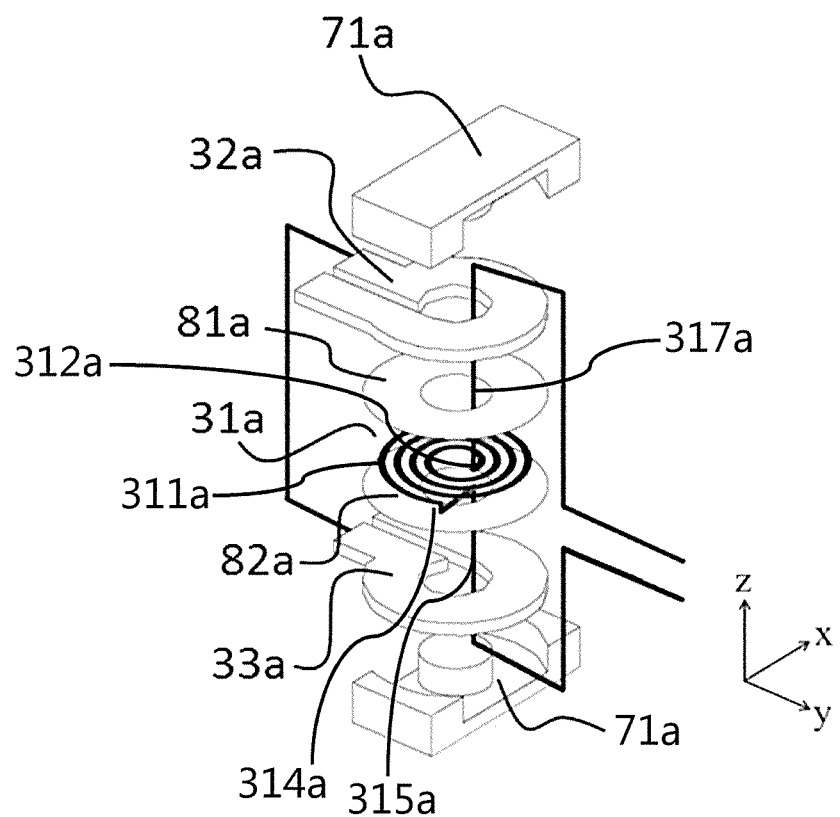
FIG. 12 is an exploded perspective view showing a configuration of an isolation transformer according to a fifth embodiment of this invention.

FIG. 12 is an exploded perspective view showing a configuration of an isolation transformer according to the fifth embodiment of this invention. Note that in the fifth embodiment, description of points that are similar to the first to fourth embodiments will be omitted, and points that differ from the first to fourth embodiments will mainly be described.

In the first coil group 3a, the outer peripheral side lead wire 315a is drawn out from the outer peripheral side end portion 314a in the negative direction of the z axis, and then drawn out to the outer peripheral side of the primary side coil 31a. Further, a fifth inner peripheral side lead wire 317a is drawn out from the inner peripheral side end portion 312a in the positive direction of the z axis, and then drawn out to the outer peripheral side of the primary side coil 31a.

More specifically, the outer peripheral side lead wire 315a is drawn out in the negative direction of the z axis through the central holes formed respectively in the insulating spacer 82a and the secondary side coil 33a, which face the primary side coil 31a, and then drawn out in the positive direction of the y axis. Further, the fifth inner peripheral side lead wire 317a is drawn out in the positive direction of the z axis through the central holes formed respectively in the insulating spacer 81a and the secondary side coil 32a, which face the primary side coil 31a, and then drawn out in the positive direction of the y axis.

Note that the outer peripheral side lead wire 315a may be drawn out in the positive direction of the z axis, and the fifth inner peripheral side lead wire 317a may be drawn out in the negative direction of the z axis.

Therefore, by configuring the isolation transformer as described in the fifth embodiment, similar effects to the first embodiment are obtained.

Sixth Embodiment

In a sixth embodiment of this invention, in contrast to the fifth embodiment, the fifth inner peripheral side lead wire 317a and a sixth inner peripheral side lead wire 318a bifurcate from the inner peripheral side end portion 312a and are then drawn out in opposite directions.

Figure 13:
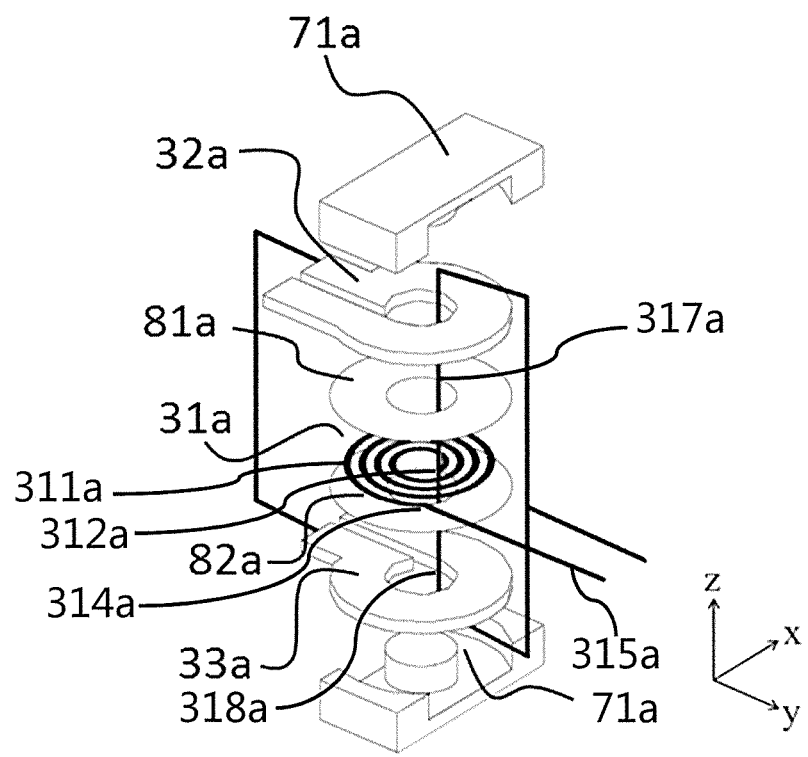
FIG. 13 is an exploded perspective view showing a configuration of an isolation transformer according to a sixth embodiment of this invention.

FIG. 13 is an exploded perspective view showing a configuration of an isolation transformer according to the sixth embodiment of this invention. Note that in the sixth embodiment, description of points that are similar to the first to fifth embodiments will be omitted, and points that differ from the first to fifth embodiments will mainly be described.

In the first coil group 3a, the outer peripheral side lead wire 315a is drawn out from the outer peripheral side end portion 314a in the positive direction of the y axis. Further, in the first coil group 3a, the fifth inner peripheral side lead wire 317a and the sixth inner peripheral side lead wire 318a bifurcate from the inner peripheral side end portion 312a, whereupon the fifth inner peripheral side lead wire 317a is drawn out in the positive direction of the z axis and the sixth inner peripheral side lead wire 318a is drawn out in the negative direction of the z axis. Further, the fifth inner peripheral side lead wire 317a is drawn out to the outer peripheral side of the primary side coil 31a after being drawn out in the positive direction of the z axis, and the sixth inner peripheral side lead wire 318a is drawn out to the outer peripheral side of the primary side coil 31a after being drawn out in the negative direction of the z axis.

More specifically, as shown in FIG. 13, the fifth inner peripheral side lead wire 317a is passed through the central hole in the secondary side coil 32a facing the primary side coil 31a, and then drawn out to the outer peripheral side of the primary side coil 31a. Further, the sixth inner peripheral side lead wire 318a is passed through the central hole in the secondary side coil 33a facing the primary side coil 31a, and then drawn out to the outer peripheral side of the primary side coil 31a.

Furthermore, the fifth inner peripheral side lead wire 317a and the sixth inner peripheral side lead wire 318a drawn out to the outer peripheral side of the primary side coil 31a converge on the outer peripheral side of the primary side coil 31a.

Therefore, by configuring the isolation transformer as described in the sixth embodiment, similar effects to the first embodiment are obtained.

Seventh Embodiment

In a seventh embodiment of this invention, the fifth and sixth inner peripheral side lead wires 317a and 318a bifurcating from the inner peripheral side end portion 312a are drawn out differently to the sixth embodiment.

Figure 14:
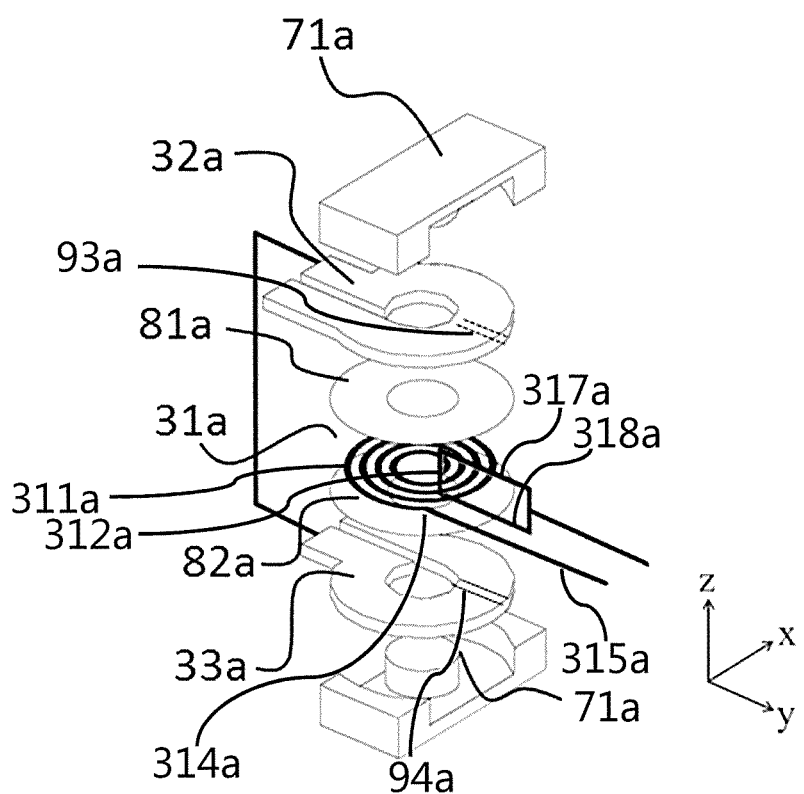
FIG. 14 is an exploded perspective view showing a configuration of an isolation transformer according to a seventh embodiment of this invention.

FIG. 14 is an exploded perspective view showing a configuration of an isolation transformer according to the seventh embodiment of this invention. Note that in the seventh embodiment, description of points that are similar to the first to sixth embodiments will be omitted, and points that differ from the first to sixth embodiments will mainly be described.

In the first coil group 3a, the fifth inner peripheral side lead wire 317a and the sixth inner peripheral side lead wire 318a bifurcate from the inner peripheral side end portion 312a, whereupon the fifth inner peripheral side lead wire 317a is drawn out in the positive direction of the z axis and the sixth inner peripheral side lead wire 318a is drawn out in the negative direction of the z axis. Further, the fifth inner peripheral side lead wire 317a is drawn out in the positive direction of the y axis in a position in front of the insulating spacer 81a rather than being passed through the central holes formed respectively in the insulating spacer 81a and the secondary side coil 32a, while the sixth inner peripheral side lead wire 318a is drawn out in the positive direction of the y axis in a position in front of the insulating spacer 82a rather than being passed through the central holes formed respectively in the insulating spacer 82a and the secondary side coil 33a.

The fifth inner peripheral side lead wire 317a and the sixth inner peripheral side lead wire 318a drawn out to the outer peripheral side of the primary side coil 31a converge on the outer peripheral side of the primary side coil 31a.

A fifth groove 93a is formed in the primary side coil 31a side surface of the secondary side coil 32a, and a sixth groove 94a is formed in the primary side coil 31a side surface of the secondary side coil 33a.

When the first coil group 3a is mounted in the magnetic material core, the fifth inner peripheral side lead wire 317a is housed in the fifth groove 93a and the sixth inner peripheral side lead wire 318a is housed in the sixth groove 94a. In other words, the fifth inner peripheral side lead wire 317a is drawn out to the outer peripheral side of the primary side coil 31a through the fifth groove 93a, and the sixth inner peripheral side lead wire 318a is drawn out to the outer peripheral side of the primary side coil 31a through the sixth groove 94a.

Therefore, by configuring the isolation transformer as described in the seventh embodiment, similar effects to the first embodiment are obtained.

Note that in the first to fourth embodiments, an isolation transformer configured to include one pair of coil groups was described as an example, but this invention is not limited thereto, and the invention of the present application may also be applied to an isolation transformer configured to include a plurality of pairs of coil groups. Further, in the fifth to seventh embodiments, an isolation transformer configured to include a single coil group was described as an example, but this invention is not limited thereto, and the invention of the present application may also be applied to an isolation transformer configured to include a plurality of coil groups.

The invention claimed is:

1. An isolation transformer having a pair of coil groups, each of the pair of coil groups comprising:
a primary side coil; and
a first secondary side coil and a second secondary side coil that sandwich the primary side coil perpendicular to a central axis of the primary side coil, wherein, when the central axis is set as a z axis and a perpendicular plane to the z axis is set as an xy plane, the first secondary side coil is positioned on a positive direction side of the z axis relative to the primary side coil, and the second secondary side coil is positioned on a negative direction side of the z axis relative to the primary side coil, the primary side coil comprises:

a coil portion wound in a spiral shape on a single xy plane;

an inner peripheral side lead wire drawn out from an inner peripheral side end portion of the coil portion; and an outer peripheral side lead wire drawn out from an outer peripheral side end portion of the coil portion, in a first coil group among the pair of coil groups, the inner peripheral side lead wire is drawn out in the positive direction of the z axis and then drawn out to an outer peripheral side of the primary side coil as a first inner peripheral side lead wire, in a second coil group, the inner peripheral side lead wire is drawn out in the negative direction of the z axis and then drawn out to the outer peripheral side of the primary side coil as a second inner peripheral side lead wire, and the first inner peripheral side lead wire and the second inner peripheral side lead wire are connected each other, such that the respective inner peripheral side end portions are connected to each other in series.

2. The isolation transformer according to claim 1, wherein the first inner peripheral side lead wire of the first coil group is passed through a central hole in the first secondary side coil facing the primary side coil, and then drawn out to the outer peripheral side of the primary side coil, and the second inner peripheral side lead wire of the second coil group is passed through a central hole in the second secondary side coil facing the primary side coil, and then drawn out to the outer peripheral side of the primary side coil.

3. The isolation transformer according to claim 1, wherein, in the first coil group, a first groove is formed in a primary side coil side surface of the first secondary side coil facing the primary side coil, in the second coil group, a second groove is formed in a primary side coil side surface of the second secondary side coil facing the primary side coil, in the first coil group, the first inner peripheral side lead wire is drawn out in the positive direction of the z axis and then drawn out to the outer peripheral side of the primary side coil through the first groove, and in the second coil group, the second inner peripheral side lead wire is drawn out in the negative direction of the z axis and then drawn out to the outer peripheral side of the primary side coil through the second groove.

4. The isolation transformer according to claim 1, wherein, in the first coil group, the inner peripheral side lead wire bifurcates from the inner peripheral side end portion so as to be drawn out in the positive direction of the z axis and then drawn out to the outer peripheral side of the primary side coil as the first inner peripheral side lead wire and drawn out in the negative direction of the z axis and then drawn out to the outer peripheral side of the primary side coil as a third inner peripheral side lead wire, in the second coil group, the inner peripheral side lead wire bifurcates from the inner peripheral side end portion so as to be drawn out in the negative direction of the z axis and then drawn out to the outer peripheral side of the primary side coil as the second inner peripheral side lead wire, and drawn out in the positive direction of the z axis and then drawn out to the outer peripheral side of the primary side coil as a fourth inner peripheral side lead wire, the first inner peripheral side lead wire and the third inner peripheral side lead wire that are drawn out after bifurcating and the second inner peripheral side lead wire and the fourth inner peripheral side lead wire that are drawn out after bifurcating respectively converge on the outer peripheral side of the primary side coil, and the converged first and third inner peripheral side lead wires and the converged second and fourth inner peripheral side lead wires are respectively connected to each other.

5. The isolation transformer according to claim 4, wherein, in the first coil group, the first inner peripheral side lead wire is drawn out to the outer peripheral side of the primary side coil after passing through a central hole in the first secondary side coil facing the primary side coil, and the third inner peripheral side lead wire is drawn out to the outer peripheral side of the primary side coil after passing through a central hole in the second secondary side coil facing the primary side coil, and in the second coil group, the second inner peripheral side lead wire is drawn out to the outer peripheral side of the primary side coil after passing through the central hole in the second secondary side coil facing the primary side coil, and the fourth inner peripheral side lead wire is drawn out to the outer peripheral side of the primary side coil after passing through the central hole in the first secondary side coil facing the primary side coil.

6. The isolation transformer according to claim 4, wherein, in the first coil group, a first groove is formed in a primary side coil side surface of the first secondary side coil facing the primary side coil, and a third groove is formed in a primary side coil side surface of the second secondary side coil facing the primary side coil, in the second coil group, a second groove is formed in a primary side coil side surface of the second secondary side coil facing the primary side coil, and a fourth groove is formed in a primary side coil side surface of the first secondary side coil facing the primary side coil, in the first coil group, the first inner peripheral side lead wire is drawn out in the positive direction of the z axis and then drawn out to the outer peripheral side of the primary side coil through the first groove, while the third inner peripheral side lead wire is drawn out in the negative direction of the z axis and then drawn out to the outer peripheral side of the primary side coil through the third groove, and in the second coil group, the second inner peripheral side lead wire is drawn out in the negative direction of the z axis and then drawn out to the outer peripheral side of the primary side coil through the second groove, while the fourth inner peripheral side lead wire is drawn out in the positive direction of the z axis and then drawn out to the outer peripheral side of the primary side coil through the fourth groove.

7. The isolation transformer according to claim 1, further comprising a magnetic material core in which the respective coil groups of the pair of coil groups are mounted individually.

8. The isolation transformer according to claim 1, further comprising a magnetic material core in which the pair of coil groups are mounted together.

9. An isolation transformer having a coil group comprising a primary side coil and a first secondary side coil and a second secondary side coil that sandwich the primary side coil perpendicular to a central axis of the primary side coil,
wherein, when the central axis is set as a z axis and a perpendicular plane to the z axis is set as an xy plane,
the first secondary side coil is positioned on a positive direction side of the z axis relative to the primary side coil, and the second secondary side coil is positioned on a negative direction side of the z axis relative to the primary side coil,
the primary side coil comprises:
a coil portion wound in a spiral shape on a single xy plane;
an inner peripheral side lead wire drawn out from an inner peripheral side end portion of the coil portion; and
an outer peripheral side lead wire drawn out from an outer peripheral side end portion of the coil portion, and
of the inner peripheral side lead wire and the outer peripheral side lead wire,
a first lead wire is drawn out in a positive direction of the z axis and then drawn out to an outer peripheral side of the primary side coil, and
a second lead wire is drawn out in a negative direction of the z axis and then drawn out to the outer peripheral side of the primary side coil.

10. The isolation transformer according to claim 9, wherein the first lead wire is drawn out to the outer peripheral side of the primary side coil after passing through a central hole in the first secondary side coil, and
the second lead wire is drawn out to the outer peripheral side of the primary side coil after passing through a central hole in the second secondary side coil.

11. The isolation transformer according to claim 9, wherein the inner peripheral side lead wire bifurcates from the inner peripheral side end portion so as to be drawn out in the positive direction of the z axis and then drawn out to the outer peripheral side of the primary side coil as a fifth inner peripheral side lead wire, and drawn out in the negative direction of the z axis and then drawn out to the outer peripheral side of the primary side coil as a sixth inner peripheral side lead wire, and
the fifth inner peripheral side lead wire and the sixth inner peripheral side lead wire that are drawn out after bifurcating converge on the outer peripheral side of the primary side coil.

12. The isolation transformer according to claim 11, wherein the fifth inner peripheral side lead wire is drawn out to the outer peripheral side of the primary side coil after passing through a central hole in the first secondary side coil, and the sixth inner peripheral side lead wire is drawn out to the outer peripheral side of the primary side coil after passing through a central hole in the second secondary side coil.

13. The isolation transformer according to claim 11, wherein a fifth groove is formed in a primary side coil side surface of the first secondary side coil, and a sixth groove is formed in a primary side coil side surface of the second secondary side coil, and
the fifth inner peripheral side lead wire is drawn out in the positive direction of the z axis and then drawn out to the outer peripheral side of the primary side coil through the fifth groove, while the sixth inner peripheral side lead wire is drawn out in the negative direction of the z axis and then drawn out to the outer peripheral side of the primary side coil through the sixth groove.

* * * * *